United States Patent

Ogura et al.

[11] Patent Number: 5,706,269
[45] Date of Patent: Jan. 6, 1998

[54] RECORDING MEDIUM AND RECORDING/REPRODUCTION APPARATUS THEREFOR

[75] Inventors: Yasuhiro Ogura, Tokyo; Ayataka Nishio, Kanagawa, both of Japan

[73] Assignee: Sony Corporation, Tokyo, Japan

[21] Appl. No.: 824,270

[22] Filed: Mar. 26, 1997

Related U.S. Application Data

[62] Division of Ser. No. 682,518, Jan. 5, 1996.

[30] Foreign Application Priority Data

Aug. 9, 1995 [JP] Japan ............................ 7-222749

[51] Int. Cl.[6] ............................................. G11B 7/24
[52] U.S. Cl. .......................... 369/94; 369/32; 369/275.3; 369/59
[58] Field of Search ........................... 369/32, 94, 59, 369/124, 48, 53, 56, 275.3

[56] References Cited

U.S. PATENT DOCUMENTS 5,596,565  1/1997  Yonemitsu et al. ............... 369/275.3
5,642,346  6/1997  Taira et al. ....................... 369/275.3

*Primary Examiner*—Nabil Hindi
*Attorney, Agent, or Firm*—Jay H. Maioli

[57] ABSTRACT

A recording medium which realizes high sound quality and is playable on a conventional playback device has a recording layer provided with a double-layered structure having at least a first layer L1 and a second layer L2, an audio data program is recorded on the first layer in the first data format, which is the conventional format, and the audio data program is recorded on the second layer in a second, new data format. The audio data programs recorded on the first layer and on the second layer are the same program and can be produced using 1-bit ΔΣ modulation having a high sampling rate as the new format, the ΔΣ modulated signal being passed through successive decimation filters to form the lower sampling rate signal of the conventional format. The double-layered disk can be played back using a disk judging unit that detects the disk's table of contents and controls a laser beam focus of a pick up, an operating clock frequency, and the decoder for reading out the data recorded in pits formed on the disk.

6 Claims, 6 Drawing Sheets

LASER BEAM

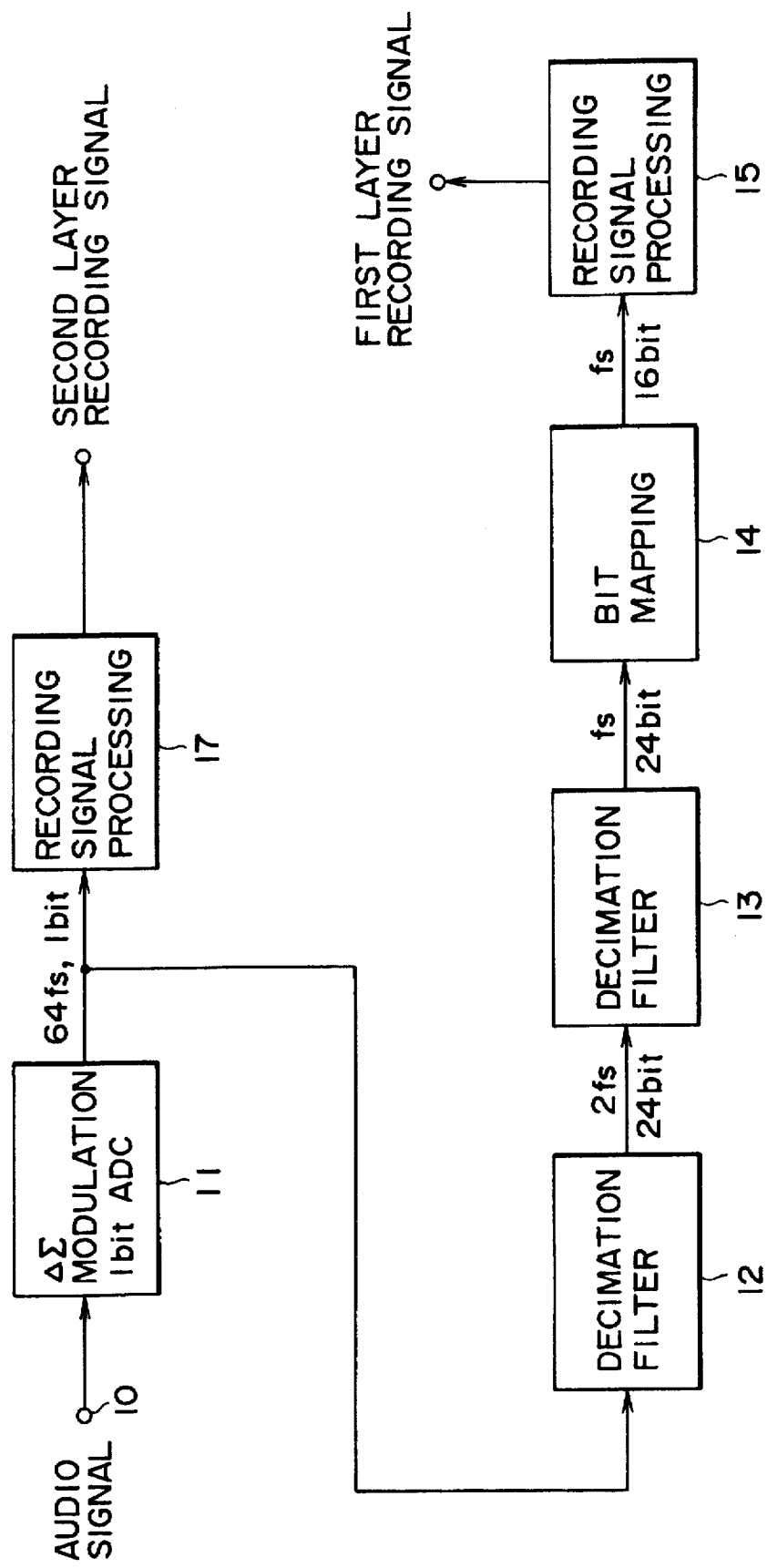

RECORDING MEDIUM AND RECORDING/REPRODUCTION APPARATUS THEREFOR

This is a division of application Ser. No. 08/682,518, filed Jan. 5, 1996.

BACKGROUND OF THE INVENTION

1. Field of Utilization

This invention relates generally to a recording medium for recording audio data in a new data format and, more specifically, to a two-layered recording medium.

2. Description of the Background

Compact disks (CD's) are now very popular as a recording media with high audio quality and typically have a diameter of about 12 cm on which digital audio data is recorded having a sampling frequency fs equal to 44.1 kHz and with 16-bit quantization.

With the progress in the audio industry and the requirement for a higher capacity and a higher transfer rate of various recording media, higher sound quality is required for the CD, which is referred to hereinafter as the first generation CD, and for realizing such higher sound quality the first approach to be considered is increasing the sampling frequency.

More specifically, the sampling frequency fs=44.1 kHz of the first generation CD restricts the frequency band component of the audio signal data up to 20 kHz, and the higher sampling frequency allows the CD to record audio data of frequencies higher than 20 kHz and a more natural fidelity sound is recorded and reproduced.

It is possible to construct a new CD media system having a data format with a higher sampling frequency than that of the first generation CD, however, such new CD media system involves various practical problems. If such new CD media system is realized, it is inevitably required that it be compatible with the first generation CD. For example, a playback device structured for new CD having a data format with the high sampling frequency is required also to playback the first generation CD. On the other, from the view point of the CD system as a recording medium, it is required that the new CD should be able to be played back on the conventional player used for the first generation CD.

Thus, although the high sound quality could be realized by simply increasing the sampling frequency, the new CD cannot be reproduced using a player for the first generation CD, so that such a new CD is not sufficient as a new CD system.

A player for the new CD system can be constructed to play back the first generation CD, however, to perform such playback, two series of digital playback circuits performing the functions of a decoder and a D/A converter for the first generation CD and a decoder and a D/A converter for the new CD system are necessary. Of course, a clock generator is also required for each circuit. Such added circuitry results in a complex, large sized, and expensive circuit structure of the playback device. Therefore, it is not a suitable solution to the problem of improving CD sound quality.

OBJECTS AND SUMMARY OF THE INVENTION

In view of solving the above-mentioned problem, it is an object of the present invention to provide a new recording medium is playable on a playback device for the first generation recording medium and also to provide a recording/reproducing apparatus for this new recording medium.

According to one aspect of the present invention, to achieve this object the recording layer is structured to have a plurality of layers comprising at least a first layer and a second layer, wherein on the first layer an audio data program recorded in the first data format, and on the second layer the audio data program recorded in the second data format. The audio data program recorded on the first layer and the second layer is the same program.

More specifically, the data recorded, for example, on the first layer which is readable on a playback device for the first generation recording medium is provided with a data format of the first generation recording medium for playback on a conventional playback device, on the other hand, when the recording medium is used on a playback device for the new system, the data recorded on the second layer on which data of a high sound quality format is recorded is read out to play back high-quality sound. As described hereinbelow, the present invention provides a high sound quality media as a new recording medium system, and also the present invention provides the convenience of compatibility with conventional playback devices.

Particularly, the second data format is provided with a sampling frequency that is an integral multiple of the sampling frequency of the first data format, the integral multiple relationship allows the structure of the compatible device for playing back the first generation recording medium and the recording medium of the present invention to be very simple.

The second data format is prescribed to the one-bit $\Delta\Sigma$ modulated signal, whereby it is possible to increase remarkably the sampling frequency and sufficiently high sound quality is realized.

More specifically, data recorded on the layer that is readable by a playback player for the first generation recording medium, that is, the first layer, is rendered in the data format for the first generation recording medium and the data is regenerated or reproduced using a conventional playback device, and a playback device for the new system reads data on the second layer on which high sound quality format data are recorded, thus, high sound quality playback is realized. A sampling frequency that is an integral multiple of that of the first data format is assigned to the second data format, so that the possibly complex structure of the compatible device for playback of both the first generation recording medium and the new recording medium of the present invention is avoided.

Moreover, it is easy to increase greatly the sampling frequency by applying a one-bit $\Delta\Sigma$ modulated signal.

BRIEF DESCRIPTION OF THE DRAWINGS

FIG. 2 is a block diagram for illustrating recording of a recording medium according to an embodiment of the present invention.

DETAILED DESCRIPTION OF PREFERRED EMBODIMENTS

Embodiments of the recording medium of the present invention will be described in detail referring to FIGS. 1 to 6 hereinafter.

The recording media described in embodiments herein are recording media for realizing higher sound quality than the first generation CD, which have sampling frequency of fs=44.1 kHz and 16 quantization bits. More specifically, the sampling frequency of the present invention is 64 times that of the first generation CD, namely 2.8224 MHZ. The first generation sampling frequency of 44.1 kHz is referred to as fs and the 2.8224 MHZ sampling frequency is referred to hereinafter as 64 fs. A one-bit ΔΣ modulated digital audio signal with a 64 fs sampling frequency is applied as the digital audio signal for recording. This new CD recording medium is referred to as the second generation CD hereinafter.

The one-bit ΔΣ modulated signal can be provided with significantly higher frequencies compared with the data capacity and the data transfer rate in the conventional PCM modulated signal. In the embodiment of the present invention with a sampling frequency of 64 fs, it is possible in principle to record and playback data high-frequency components up to 1.4 MHZ. Thereby, the second generation CD has a remarkably high sound quality compared with the conventional first generation CD. The second generation CD also has a diameter of approximately 12 cm, and the visual appearance of the second generation CD is the same as that of the first generation CD.

The sampling frequency of the second generation CD is selected as an integral multiple of the sampling frequency of the first generation CD, thereby symmetry between the second generation CD system and the first generation CD system is provided, and the compatibility is maintained for convenience and economy.

The second generation CD recording medium in accordance with the present invention records not only audio data having 64 fs sampling/one-bit ΔΣ modulated format but also audio data having the same format as the first generation CD.

For convenience in description, the audio data having the 64 fs sampling/one-bit ΔΣ modulated format is referred to as "high sampling data", whereas on the other hand the audio data having the 44.1 kHz sampling/16-bit quantized first generation CD format is referred to as "normal."

Figure 1A:
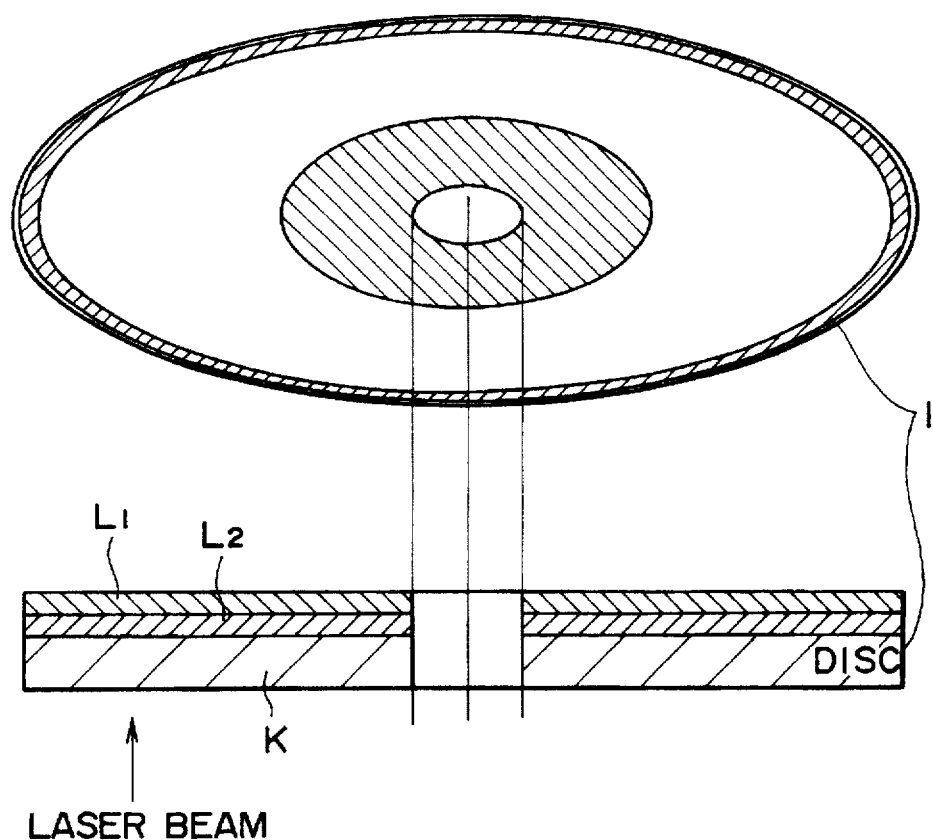
FIGS. 1A and 1B are schematic diagrams for illustrating a recording medium of an embodiment of the present invention.
Figure 1B:
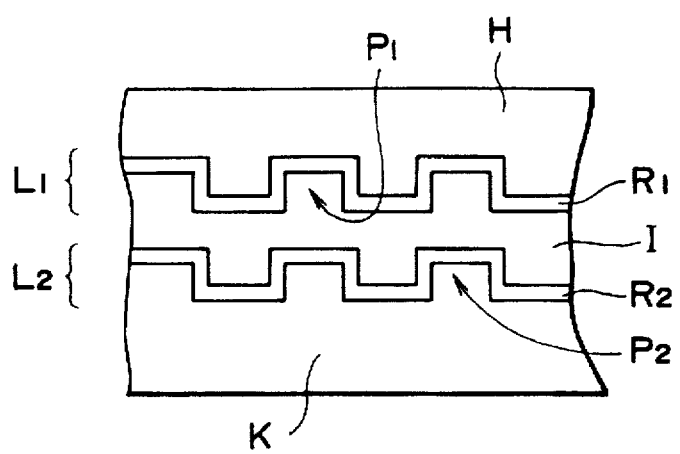

The recording layer structure of a disk 1 forming the second generation CD is shown in FIGS. 1A and 1B, in which, the recording layer of the disk 1 on which pits are to be formed is provided with a double layered structure having a first layer L1 and a second layer L2. For forming the disk 1 having such a double layered structure, as shown in FIG. 1B in detail, a pit P2 recorded as data on the second layer L2 is formed using a stamper on a disk substrate K formed of, for example, polycarbonate. A semi-transparent film R2 of dielectric material is deposited by sputtering and serves as a reflection film of the second layer L2.

Then, an ultra-violet hardening resin is cast on the reflection film to form an intermediate layer I with a thickness of about 40 μm, and the resin is pressed using a stamper to form a pit P1 in the first layer L1, while the resin is irradiated with ultraviolet rays to harden. In the same manner as was used for the first generation CD in which the pit P1 is formed, an aluminum (Al) reflection film R1 is formed by sputtering and a protective film H of an ultra-violet hardening resin is formed thereover.

Through the process described hereinabove, a disk 1 having double-layered structure as shown in FIGS. 1A and 1B is formed.

The above-mentioned second generation CD has a diameter of 12 cm and thickness of 1.2 mm and is provided with a double-layered recording area, and has a track pitch of 0.74 μm and a recording capacity of about 4.7G bytes per one layer, for a total of about 8.5G bytes. Furthermore, in an alternative to the above-mentioned disk having a double layered recording area on one side, a disk having a diameter of 12 cm and thickness of 1.2 mm with recording areas on both sides of the disk but with different formats and having a track pitch of 0.74 μm and a recording capacity of the total 9.4G bytes is also possible as a form of the second generation CD.

In this embodiment, the exact same program is recorded on the first layer L1 and the second layer L2. For example, if data of three programs A, B, and C are recorded on the first layer L1, the data of those three programs A, B, and C are recorded also on the second layer L2. The data recorded on the first layer L1 is based on digital audio data consisting of the normal data, and the data recorded on the second layer L2 is based on digital audio data consisting of the high sampling data.

Figure 3A:
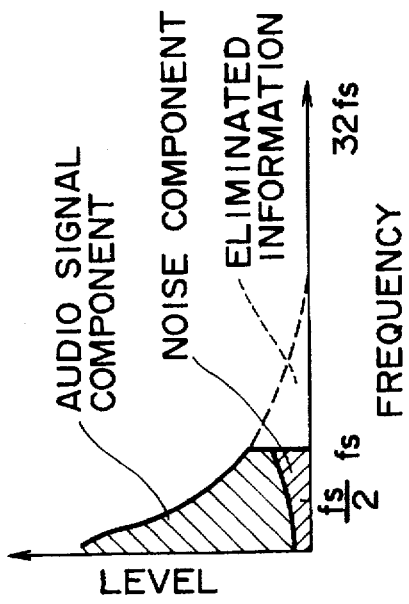
FIGS. 3A–3D are graphs for describing the frequency spectrum at each processing step of the recorded signal according to an embodiment of the present invention.
Figure 3C:
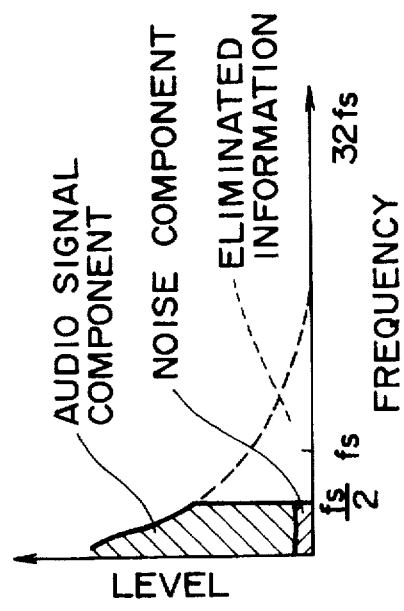
Figure 3B:
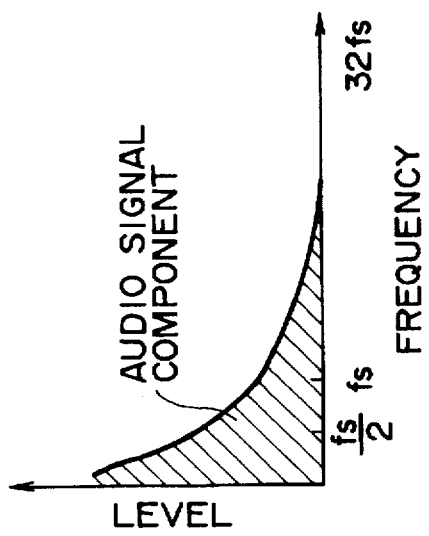

The data recorded on the first layer L1 and the second layer L2 of the second generation CD are described referring to FIG. 2 and FIGS. 3A–3D. FIG. 2 is a block diagram of a portion of the recording system used in the manufacturing of the second generation CD. An analog audio signal comprising an original audio signal from a master tape is fed in at terminal 10. The frequency spectrum of such an analog audio signal is shown in FIG. 3A. The analog audio signal is converted to digital data by ΔΣ modulation using a one-bit A/D converter 11, wherein the sampling frequency is changed to 64 fs and a digital audio signal of 64 fs/one-bit format is output. The frequency spectrum of this digital audio signal of 64 fs/one-bit format is shown in FIG. 3B.

In principle, data in a frequency band up to 32 fs is digitized, so that almost all components of the analog audio signal shown in FIG. 3A form the digital data.

The quantized noise components are concentrated in the high-frequency region on the frequency axis, because of the noise shaping function in ΔΣ modulation.

The digital audio signal of the 64 fs/one-bit format is fed to a recording signal processor 17 and modulated to a recording signal as it is. In other words, the 64 fs/one-bit signal is used as the digital audio data to be recorded. In the recording signal processor 17, for example, modulation processing for adding an error correction code and forming Eight-Fourteen modulation (EFM) is performed, and signals corresponding to the bit information actually formed on the disk are generated as the recording signals.

The recording signal is a signal to be recorded on the second layer L2 of the disk 1, and the signal is a recording signal based on digital audio data consisting of the high sampling data of the 64 fs/one-bit format, and is the data to be recorded as pit P2 shown in FIG. 1B.

The 64 fs/one-bit signal outputted from the ΔΣ modulation one-bit A/D converter 11 is fed simultaneously to a decimation filter 12 and converted to digital data of 2 fs (=88.2 kHz)/24-bit format. The frequency spectrum of the digital data of the 2 fs/24-bit format is shown in FIG. 3C. As shown therein, the sampling frequency is cut off at 2 fs, and data components in a frequency band up to the frequency of fs remain.

Figure 3D:
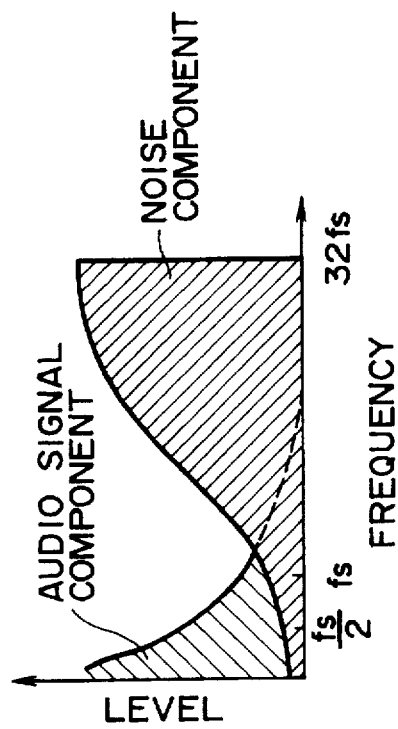

Subsequently, through the operation of a second decimation filter 13, the data is further converted to digital data of fs (=44.1 kHz)/24-bit format. The frequency spectrum of the digital data of fs/24-bit format is shown in FIG. 3D, where it is shown that only data components in the frequency band up to (½)fs remain.

Through the operations of the decimation filters 12 and 13 the sampling frequency is changed to 1/64 of the sampling frequency used in the $\Delta\Sigma$ modulation, however, this operation is not what is typically called sampling rate conversion, but rather is a completely synchronous digital filtering for performing decimation in a ratio of 64:1. Therefore, there is no cause for generating jitter.

The digital data of the fs/24-bit format are converted to data with 16 quantized bits by a bit mapping device 14 and fed to a sound recording signal processor 15. In the recording signal processor, necessary processing such as the addition of an error correction code and performing Eight-Fourteen modulation (EFM) is performed on the digital audio signal of the fs/16-bit form at to generate a recording signal. This recording signal is the signal to be recorded on the first layer L1. More specifically, this signal is a recording signal based on digital audio data comprising the normal data of the fs/16 bit format, and then is recorded as pit P1 shown in FIG. 1B.

As described hereinabove, when data is recorded on the disk, not only is high sound quality data for the second generation CD recorded on the second layer L2 but also matching data for the first generation CD is recorded on the first layer L1. Thus, it appreciated that the data recorded on the first layer L1 and the second layer L2 are the same data.

As described hereinabove, such a disk 1 as the second generation CD can be used not only for playback of high sound quality on a playback device matching the format of the second generation CD as described, but also for playback of the sound quality of the first generation CD level on a playback device matching the format of the first generation CD.

The sampling frequency of the high sampling data is an integral multiple of that of the normal data, that is, the first generation CD, therefore, the data recorded on the first layer of the disk 1 is not inferior to the first generation CD in sound quality. More specifically, the sampling frequency is converted through the decimation filter processing without using a sampling rate converter, so that the jitter usually accompanying sampling rate conversion is not generated, therefore, a sound quality of the same level as that obtained when an analog audio signal is sampled directly at 44.1 kHz is obtained.

Figure 4:
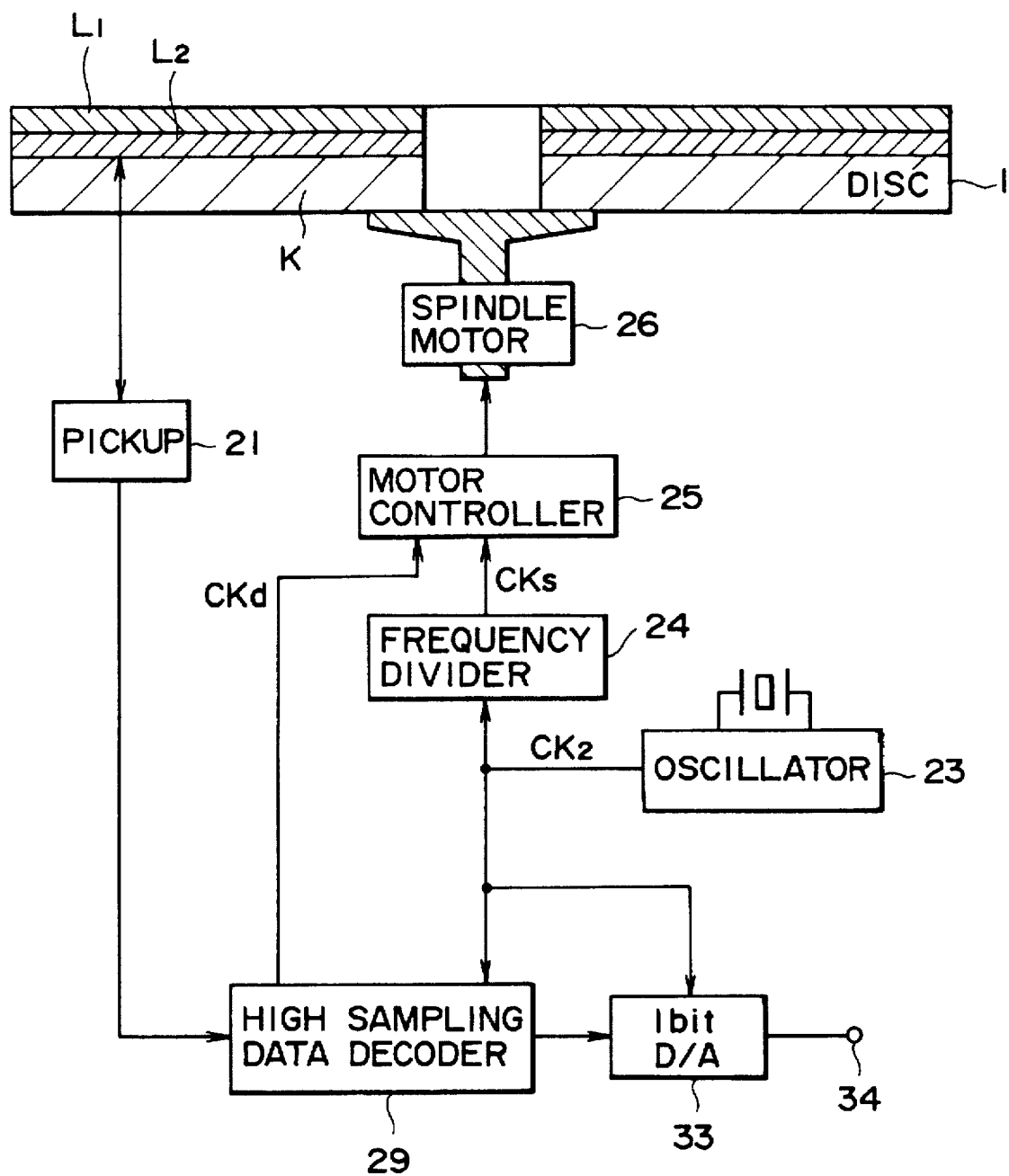
FIG. 4 is a schematic diagram for illustrating a playback apparatus for a second generation disk according to an embodiment of the present invention.

Next, the playback operation of the disk 1 comprising the second generation CD is explained. FIG. 4 is a block diagram of a system for the playback of the disk 1 on a playback device matching the format of the second generation CD. The disk 1 is driven rotationally by a spindle motor 26. The spindle motor 26 is driven at a constant linear velocity responding to a driving signal generated from a motor controller 25. The spindle servo operation for constant linear velocity control by the motor controller 25 is not described in detail herein because this technique is well known in connection with the first generation CD, however, generally a clock signal CK2 generated by an oscillator 23 is divided by a frequency divider 24, and the standard clock signal CKs of a prescribed frequency corresponding to the disk rotational speed for the second generation CD system is obtained. The standard clock signal CKs and PLL clock signal CKd synchronous with the playback data are compared by the motor controller 25 to generate an error signal. Power which corresponds to the error signal is applied to the spindle motor 26 by the motor controller 25 to activate the constant linear velocity servo. The PLL clock signal CKd is generated, for example, by feeding the data extracted in a high sampling data decoder 29 to a PLL circuit (not shown).

The disk 1 is rotated and simultaneously a pickup 21 irradiates a laser beam on the record surface of the disk 1. The reflected beam is detected by the pickup 21 in order to read the information in the pits formed on the disk 1.

When the focus point of the pickup 21 is set so as to be on the second layer L2, and the wave-length of the laser beam from the pickup 21 is selected so that the laser beam is reflected by the reflection film R2, as shown in FIG. 1B, the information recorded as pits P2 on the second layer L2 is read by the pickup 21. The information read by the pickup 21 is fed to the high sampling data decoder 29. The high sampling data decoder 29 performs the decoding of the digital audio signal of the 64 fs/one-bit format.

The clock signal CK2 having a frequency used for decoding the high sampling data, namely the second generation CD, is generated by the oscillator 23, and the clock signal CK2 is fed to the high sampling data decoder 29 and to a one-bit D/A converter 33.

The pit information from the second layer L2 extracted by the pickup 21 is decoded by the high sampling data decoder 29, so that the digital audio signal of 64 fs/one-bit format is decoded. The resultant digital audio signal of the 64 fs/one-bit format is fed to the one-bit D/A converter 33 to convert it to an analog audio signal for output at terminal 34.

By following the above-mentioned operations, the high sound quality playback sound from the second generation CD is obtained.

Figure 5:
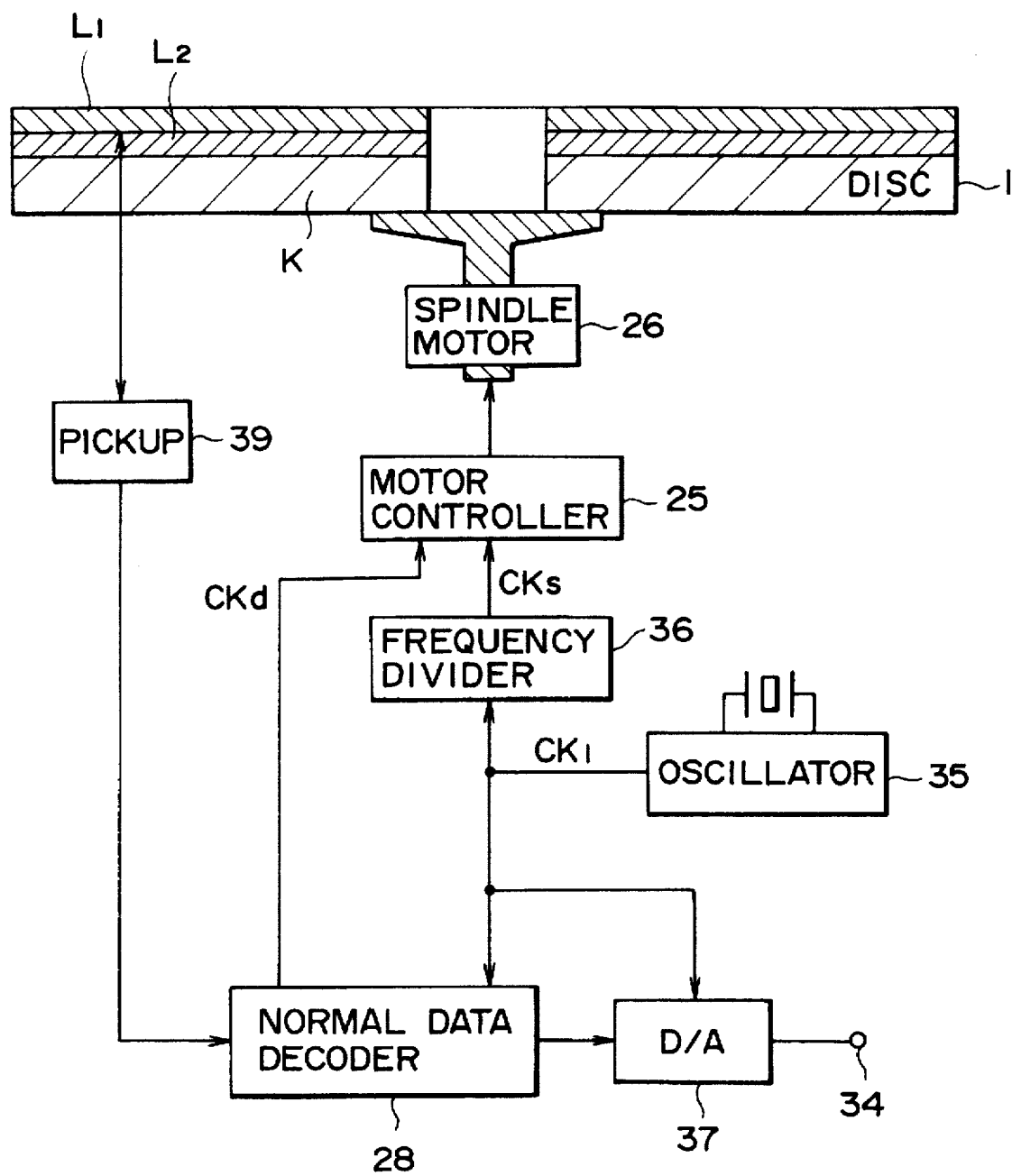
FIG. 5 is a schematic diagram for illustrating a playback apparatus for a second generation disk according to an embodiment of the present invention in which conventional data is reproduced.

FIG. 5 is a block diagram illustrating a system for the playback of the disk 1 on a playback device for the first generation CD. The disk 1 is driven rotationally by the spindle motor 26, and the spindle motor 26 is driven at a constant linear velocity in response to a driving signal from the motor controller 25.

In the spindle servo operation for controlling the constant linear velocity control by the motor controller 25, a clock signal CK1 from an oscillator 35 is divided using a frequency divider 36 to obtain the standard clock signal CKs with a prescribed frequency that corresponds to the disk rotation speed matching the format of the first generation CD. Then, the standard clock signal CKs and PLL clock signal CKd that is synchronous with the playback data are compared to generate an error signal. Power is applied to the spindle motor 26 corresponding to the error signal to activate the constant linear velocity servo. The PLL clock signal CKd is generated by feeding the data extracted in a normal data decoder 28 to the PLL circuit.

The disk 1 is rotated and simultaneously a pickup 39 irradiates a laser beam on the record surface of the disk 1, and the reflected beam is detected by the pickup 39 in order to read the information in the pits formed on the disk 1. The laser beam of the pickup 39 for the first generation CD has a wavelength which passes through the semi-transparent reflection film R2 shown in FIG. 1B, therefore, the laser beam is reflected from the aluminum reflection film R1. In this way, the information formed as pits P1 on the first layer L1 is read by the pickup 39.

The information read by the pickup 39 is fed to the normal data decoder 28. The normal data decoder 28 is the part of the system that decodes the digital audio signal of the fs/16-bit format from the pit information.

The clock signal CK1 of the frequency used for decoding the first generation CD, namely the normal data, is generated from the oscillator 35, and then the clock signal CK1 is fed to the normal data decoder 28 and to a standard D/A converter 37.

The pit information on the first layer L1 that is extracted by the pickup 39 is decoded using the normal data decoder 28, thereby the digital audio signal of the fs/16-bit format is decoded. This decoded digital audio signal of the fs/16-bit format is fed to the D/A converter 37 and then converted to the analog audio signal fed out at terminal 34.

As described hereinabove, the disk 1 of the second generation CD can be also played back on a playback device for the first generation CD.

The sound quality of the playback sound is the same as that of the first generation CD, and the sound quality will not be degraded.

Figure 6:
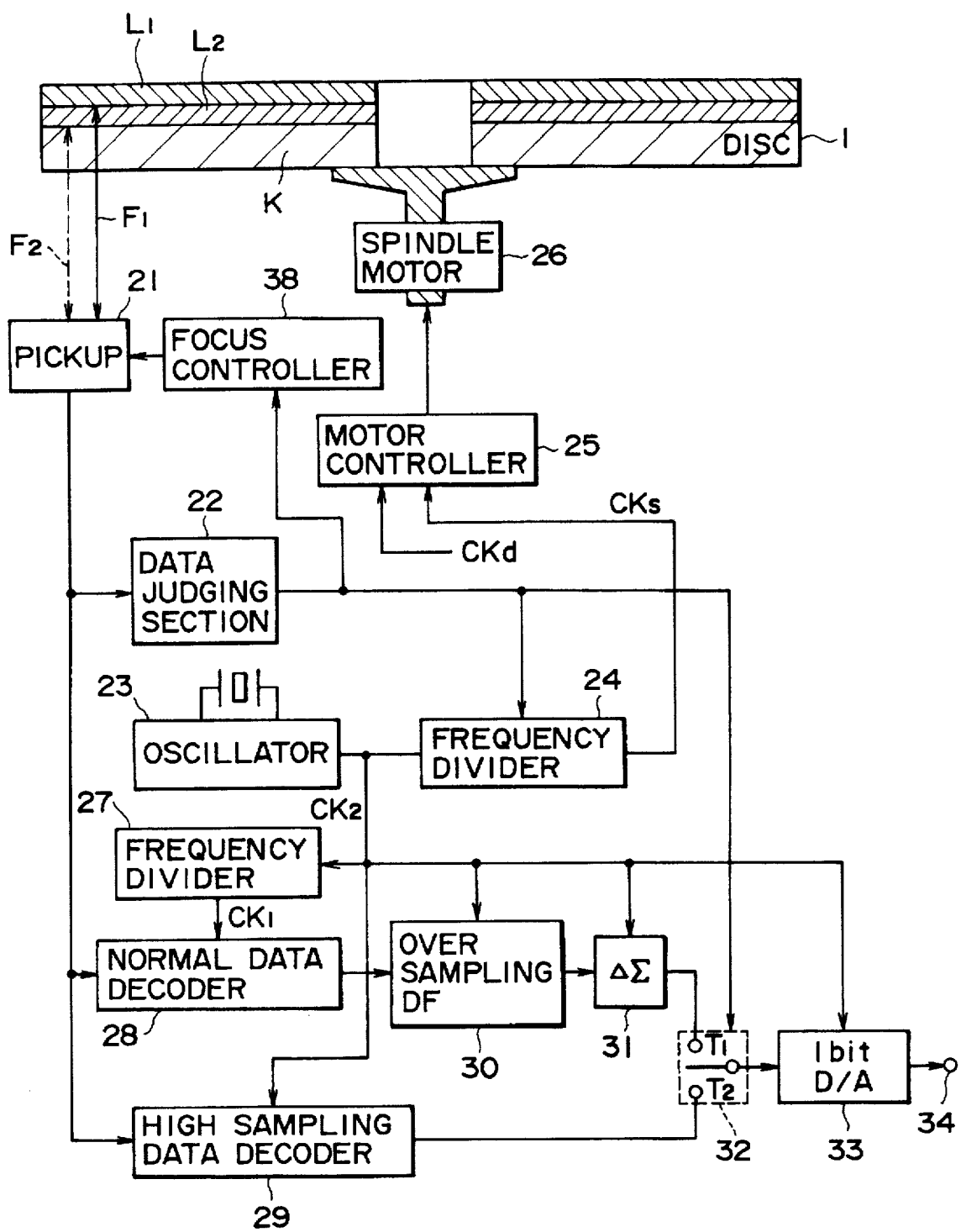
FIG. 6 is a schematic diagram for illustrating a playback apparatus for a second generation disk according to an embodiment of the present invention that is compatible with both first and second generation disks.

FIG. 6 shows a block diagram illustrating the playback of the second generation CD on a playback device that matches the formats for both the first generation CD and the second generation CD.

Though the second generation CD having a double layered structure is shown in FIG. 6 comprising the disk 1, a first generation CD having a single layered structure equivalent to the first layer L1 may also be mounted. The spindle motor 26 for rotationally driving the disk 1 is driven at a constant linear velocity in response to the driving signal from the motor controller 25.

In the spindle servo operation for controlling the constant linear velocity control by the motor controller 25, the standard clock signal CKs of a prescribed frequency is obtained by dividing the clock signal CK2 from the oscillator 23 using the frequency divider 24. The standard clock signal CKs and the PLL clock signal CKd synchronous with the playback data are compared in the motor controller 25 to generate an error signal. Power is applied to the spindle motor 26 corresponding to the error signal to activate the constant linear velocity servo.

The PLL clock signal CKd is generated by feeding the data extracted in the normal data decoder 28 or the high sampling data decoder 29 to the PLL circuit (not shown).

The disk 1 is rotated and simultaneously the pickup 21 irradiates a laser beam on the record surface of the disk 1, and the information recorded in the pits formed on the disk 1 is read.

The focus point of the pickup 21 is selectively adjustable to focus F2 on the second layer L2 or to focus F1 on the first layer L1 by an adjusting signal from a focus controller 38. Therefore, when the disk 1 is a disk of the second generation CD having a double-layered structure, as shown in FIG. 6, not only the pit information on the second layer L2 having the high tone quality data but also the pit information on the first layer L1 can be read. When the disk 1 is a first generation CD, of course, the focus is adjusted so as to be on the pit data of the first or only layer.

The information read by the pickup 21 is fed to the high sampling data decoder 29 and to the normal data decoder 28.

The clock signal CK2 from the oscillator 23 has a frequency for decoding the high sampling data, and the clock signal CK2 is fed to the high sampling data decoder 29. The clock signal CK2 from the oscillator 23 is converted to the clock signal CK1 of a frequency used for decoding the normal data by a frequency divider 27, and the clock signal CK1 is fed to the normal data decoder 28. A digital audio signal with a sampling frequency of 64 fs/one bit format is output as the decoded signal from the high sampling data decoder 29, and the output is fed to an input terminal T2 of a switch 32.

A digital audio signal with a sampling frequency of fs/16 bit format is output as the decoded signal from the normal data decoder 28, and the output is converted to the digital audio signal with a sampling frequency of 64 fs/one bit format through an over sampling digital filter 30 and a ΔΣ modulation circuit 31. The digital audio signal output from the ΔΣ modulation circuit 31 is fed to an input terminal T1 of the switch 32.

The selected output from the switch 32 is fed to the one-bit D/A converter 33 to convert the output to the analog audio signal made available at terminal 34. The clock signal CK2, which is the same clock signal as that for the high sampling data decoder 29, is also fed to the one-bit D/A converter 33.

A disk judging section 22 judges whether the disk that has been mounted is a first generation CD or a second generation CD. This judgment is made possible by reading the table of contents (TOC) data recorded on the innermost periphery of the disk, regardless of its generation.

The disk judging section 22 controls the switch 32, the dividing ratio of the frequency divider 24, and the focus controller 38 depending on the results of the judgment.

The playback device is operated as described as follows when the disk 1 to be regenerated or played back is a second generation CD having a double-layered structure, as shown in FIG. 6. First, the disk judging section 22 judges whether the disk is a second generation CD based on the TOC data of the disk 1 and, if so, the dividing ratio of the frequency divider 24 is set to a value that corresponds to the second generation CD; the output of the switch 32 is connected to the input terminal T2; and the focus controller 38 is set to the condition F2 for focusing the beam on the second layer L2. The dividing ratio of the frequency divider 24 is prescribed to a value that corresponds to the second generation CD, whereby the frequency of the standard clock signal CKs used for the constant linear velocity servo of the motor controller 25 is converted to a frequency for the second generation CD. In other words, the disk 1 is driven rotationally at a constant liner velocity matching the requirements of the second generation CD.

The pit information on the second layer L2 extracted by the pickup 21 is decoded by the high sampling data decoder 29, so that the digital audio signal of 64 fs/one-bit format is decoded and fed to the switch 32. The output of the switch 32 is connected to the input terminal T2, and the digital audio signal of the 64 fs/one-bit format is fed to the one-bit D/A converter 33 and converted to the analog audio signal for output at terminal 34.

On the other hand, the playback device is operated as described as follows when the disk 1 to be regenerated or played back is a first generation CD. First, the disk judging section 22 judges whether the disk is the first generation CD based on the TOC data of the disk 1, and the dividing ratio of the frequency divider 24 is set to a value that corresponds to the first generation CD; the output of the switch 32 is connected to the input terminal T1; and the focus controller 38 is set to the condition F1 for focusing the laser beam on the first layer L1. In this case, there is no second layer on the first generation CD, therefore, the special control for selecting the first layer is unnecessary, and the point focusing of the known kind by the focus search/servo operation is sufficient for the first generation CD.

The dividing ratio of the frequency divider 24 is prescribed to a value that corresponds to the first generation CD, so that the frequency of the standard clock signal CKs used for the constant linear velocity servo of the motor controller 25 is converted to a frequency for the first generation CD. In other words, the disk 1 is driven rotationally at a constant liner velocity matching the requirements of the format of the first generation CD.

Then, the pit information extracted by the pickup 21 is decoded by the normal data decoder 28, so that the digital audio signal of fs/16-bit format is decoded. The digital audio signal of the fs/16-bit format that has been decoded is converted to the digital audio signal of 64 fs/one bit format by the over sampling digital filter 30 and the $\Delta\Sigma$ modulation circuit 31, both of which are operated with the signal clock CK2. The output of the $\Delta\Sigma$ modulator 31 is fed to input terminal T1 of the switch 32. The output of the switch 31 is connected to the input terminal T1 under control of the disk judging section 22, and the digital audio signal of the 64 fs/one-bit format is fed to the one-bit D/A converter 33, and converted to the analog audio signal available at terminal 34.

In the playback device of this type, if the mounted disk 1 is judged by the disk judging section 22 as a second generation CD having a double-layered structure, it is possible to extract and playback the pit data on the first layer. In this case, the dividing ratio of the frequency divider 24 is set to a value that corresponds to the first generation CD, and the output of the switch 32 is connected to the input terminal T1. The pickup 21 is set to the condition F1 for focusing on the first layer. Then, the pit information on the first layer read by the pickup 21 is decoded by the normal data decoder 28 to convert the pit information to the digital audio signal of the fs/16 bit format. The digital audio signal of fs/16-bit format is converted to the digital audio signal of 64 fs/one bit format by the over-sampling filter 30 and $\Delta\Sigma$ modulation circuit 31. The audio signal of 64 fs/one bit format is fed to the one-bit D/A converter 33 through the input terminal T1 and the output of the switch 32 and converted to the analog audio signal output.

By using the playback device shown in FIG. 6 which is capable of the above-mentioned operations, the data on the second layer L2 of the disk of the second generation CD is regenerated, thereby the high sound quality playback of audio data of the 64 fs format is realized. The sampling frequency of the high sampling data recorded on the second layer L2 is prescribed to be an integral multiple of the sampling frequency of the normal data recorded on the first layer L1 and first generation CD, thereby the playback device, as shown in FIG. 6, that is compatible with the first generation CD can be realized without using a seriously complex clock system.

In other words, for the clock system, the ratio of sampling frequency of the high sampling data and the normal data is prescribed to a ratio of integers, so that the clock signal generated from the oscillator 23 is used commonly. A clock having a required frequency is easily generated using only a frequency divider without the need for a plurality of oscillators. Therefore, it is not necessary to structure two independent master clock systems, and this embodiment allows the clock system circuit to be constructed simply.

On the other hand, in the playback system the one-bit D/A converter 33 can be used commonly, so that the playback system circuit can be structured simply and without degradation in sound quality.

The one-bit D/A converter 33 is a D/A converter which is operated corresponding to playback data of the high sampling data. To use the D/A converter commonly with playback data of the normal data, the data of fs/16 bit format generated from the normal data decoder 28 should be converted to the data of the 64 fs/one bit format. In this embodiment, however, because the sampling frequencies are in the relationship of an integral multiple, the data is subjected to the 64 times over-sampling through the over-sampling filter 30, and the data is converted to one-bit format through the $\Delta\Sigma$ modulation circuit 31, these two operations are sufficient for satisfying the requirement. Therefore, it is not necessary to use a sampling rate converter and not using a sampling rate converter eliminates the cause of jitter generation.

The embodiment described hereinabove refers to the first generation CD as the current CD system and to the second generation CD matched to the first generation CD, however, the present invention is applied to not only a CD system but also other systems. For example, in the case of a digital tape recorder system, a record playback system which is applied with a sampling frequency of an integral multiple of 44.1 kHz is realized.

Otherwise, in the case of a record playback system having a sampling frequency of 32 kHz or 48 kHz, a second generation system having sampling frequencies of 32 kHz× n, or 48 kHz×n, where n represents an integer, can be structured. In the case of a disk, for example, 48 kHz sampling data can be recorded on the first layer and 96 kHz sampling data can be recorded on the second layer.

The recording layer structure of a recording medium may also be a structure comprising three layers or more layers.

Although the present invention has been described hereinabove with reference to the preferred embodiment, it is to be understood that the invention is not limited to such illustrative embodiment alone and various modifications may be contrived without departing from the spirit or essential characteristics thereof, which are to be determined solely from the appended claims.

What is claimed is:

1. An apparatus for reproducing digital audio signals recorded on a recording medium comprised of a plurality of recording layers encoding a respective plurality of digital audio signals, comprising:

a pickup head arranged for reproducing a selected one of said plurality of digital audio signals from said plurality of layers;

a plurality of decoding means, each for decoding a respective one of said plurality of digital audio signals;

digital to analog conversion means for receiving outputs of said plurality of decoding means and for outputting an analog signal; and selecting means for controlling said pickup head to reproduce said selected one of said plurality of digital audio signals and for connecting said selected signal to said respective one of said plurality of decoding means, whereby said digital to analog conversion means outputs an analog signal corresponding to said selected digital audio signal.

2. The apparatus according to claim 1 further comprising:

recording medium detection means for detecting whether the recording medium is comprised of a single recording layer and for controlling said selection means in response to a detection result, whereby when said detection means detects said single recording layer said selection means controls said pickup head to extract a digital signal from said single layer and connects said digital signal to one of said plurality of decoding means for decoding said digital signal from said single layer.

3. The apparatus according to claim 2 wherein said recording medium is an optically readable disk.

4. The apparatus according to claim 3 wherein said recording medium detecting means comprises an optical head for reading table of contents data recorded at a predetermined location on said optically readable disk.

5. The apparatus according to claim 1 wherein said plurality of digital signals comprise one-bit encoded, delta sigma modulated digital signals and wherein each of said plurality of signals represent an audio program encoded at a respective plurality of clock periods, said clock periods being integer multiples of a base clock period.

6. The apparatus according to claim 5 wherein said digital to analog conversion means converts said selected digital signal at said base clock period and each of said decoding means adapted to decode signals at clock periods longer than said base clock period oversamples said digital signal to generate an output of a period equal to the base clock period.

* * * * *